United States Patent [19]
Reade

[11] 3,812,689
[45] May 28, 1974

[54] METHOD OF MAKING GLASS-CERAMIC ARTICLES

[75] Inventor: Richard F. Reade, Corning, N.Y.

[73] Assignee: Corning Glass Works, Corning, N.Y.

[22] Filed: May 26, 1972

[21] Appl. No.: 257,324

[52] U.S. Cl.................................. 65/33, 106/39.7
[51] Int. Cl............................................ C03b 29/00
[58] Field of Search........................ 65/33; 106/39.7

[56] References Cited
UNITED STATES PATENTS
3,582,385   6/1971   Duke et al. .................... 65/33
3,732,116   5/1973   Reade ............................. 65/33 X

*Primary Examiner*—Frank W. Miga
*Attorney, Agent, or Firm*—Clinton S. Janes, Jr.

[57] ABSTRACT

This invention relates to the production of glass-ceramic articles having compositions within the $Li_2O$-$Al_2O_3$-$SiO_2$ field which are modified through the addition of ZnO in combination with a second metal oxide ($R_mO_n$) selected from the group consisting of SrO, BaO, $Y_2O_3$, $La_2O_3$, and mixtures thereof. When nucleated with $TiO_2$, beta-spodumene solid solution crystals are formed as the predominant crystal phase with minor amounts of such secondary crystal phases as gahnite, rutile, or anatase, and complex crystals associated with the second metal oxides also being present. The resultant products exhibit low coefficients of thermal expansion and excellent creep resistance up to temperatures of 1,000°C. and higher. This desirable combination of properties can frequently be achieved where the heat treatment to produce the glass-ceramic body is of relatively short duration.

3 Claims, No Drawings

METHOD OF MAKING GLASS-CERAMIC ARTICLES

A glass-ceramic article contemplates the controlled crystallization in situ of a glass article through the heat treatment thereof. The steps of manufacture of a glass-ceramic article are three. First, a glass-forming batch including, commonly, a nucleating agent is melted. Second, that melt is simultaneously cooled and an article of glass shaped therefrom. Third, the glass article is exposed to a heat treating procedure wherein nuclei are initially developed therein which provide sites for the growth of crystals thereon as the heat treating is continued.

Since a glass-ceramic article is the result of crystal development effected by means of substantially simultaneous growth on countless nuclei distributed throughout the precursor glass article, the structure thereof is free of voids, nonporous, and consists of relatively uniformly-sized, fine-grained crystals homogeneously dispersed in a glassy matrix, the crystals comprising the predominant proportion of the article. Accordingly, glass-ceramic articles are normally characterized as being greater than 50% crystalline and, often, are actually greater than 90% crystalline. Inasmuch as a glass-ceramic article is commonly very highly crystalline, the physical and chemical properties demonstrated thereby will more closely approximate those of the crystals than those of the residual glassy matrix. Furthermore, the very high crystallinity leads to the residual glassy matrix having a composition which is much different chemically from that of the parent glass article since the components making up the crystals will have been precipitated therefrom.

The crystal phases grown within an individual glass-ceramic article is a function of both the original glass composition and the schedule of heat treatment to which the glass article is subjected. A rather complete discussion of the theoretical concepts and the practical considerations involved in the production of glass-ceramic articles can be found in U.S. Pat. No. 2,920,971 to which reference is hereby made for such information.

U.S. Pat. No. 3,582,385 describes the production of glass-ceramic bodies exhibiting coefficients of thermal expansion (25°–900°C.) less than $15 \times 10^{-7}/°C.$ and good dimensional stability upon long time exposures to temperatures up to 800°C. Such bodies were produced through the crystallization in situ of glass bodies having compositions within the $Li_2O$-$BaO$-$Al_2O_3$-$SiO_2$ field which, when nucleated with $TiO_2$ and, optionally $ZrO_2$, would be converted to glass-ceramic bodies containing beta-spodumene solid solution and celsian as the primary crystal phases. Thus, the base glass consisted essentially, by weight on the oxide basis, of 3.5–5% $Li_2O$, 2.5–5% $BaO$, 15–21% $Al_2O_3$, 65–75% $SiO_2$, and 3.5–8% of the nucleating agents.

That patent also pointed out that glass-ceramic articles displaying low coefficients of thermal expansion due to the presence of betaspodumene as the principal crystal phase were well known to the art. However, dimensional stability upon thermal cycling had been lacking in such bodies until the discovery of the disclosed $Li_2O$-$BaO$-$Al_2O_3$-$SiO_2$ compositions. Finally, that patent emphasized the need to delete those metal oxides from the base composition which would tend to form secondary crystal phases whose solid solubility with beta-spodumene varies as a function of temperature. The three such metal oxides mentioned were $MgO$, $ZnO$, and $B_2O_3$. Likewise, the presence of $Na_2O$ and $K_2O$ was eschewed since these promoted the development of residual glass which could also reduce high temperature stability. Nevertheless, where only $Li_2O$, $Al_2O_3$, and $SiO_2$ comprised the base glass, cracking of the body during the crystallization heat treatment frequently occurred. Hence, some fluidity was required to be maintained in the glass to allow stress release during the initial crystallization of the glass to beta-quartz solid solution where there is a great exothermic reaction accompanied with a large change in density. The beta-quartz solid solution is converted to beta-spodumene solid solution as the heat treatment is continued. Furthermore, the simple $Li_2O$-$Al_2O_3$-$SiO_2$ glass compositions tended to exhibit secondary grain growth in the absence of a second crystal phase which would inhibit such growth.

Therefore, the primary teaching of that patent was two-fold. First, the $BaO$ remained in the glassy phase during the initial crystallization which reduced the tendency to cracking. Second, as the heat treatment was continued, the $BaO$ entered into the crystallization process by causing the growth of celsian which inhibited grain growth without causing thermal instability. This latter phenomenon decreased the amount of residual glassy matrix in the final product which led to a consequent improvement in thermal stability.

Whereas the glass-ceramic articles disclosed in that patent do, indeed, illustrate low coefficients of thermal expansion and excellent dimensional stability at temperatures up to 800°C., there has been the need for compositions which would exhibit good dimensional stability and creep resistance but at temperatures approaching 1,000°C. U.S. application Ser. No. 82,844, now U.S. Pat. No. 3,732,116 filed Oct. 21, 1970 by the present inventor, describes one group of such products.

That application disclosed the fact that glass-ceramic articles consisting essentially solely of $Li_2O$, $Al_2O_3$, and $SiO_2$ which, when nucleated with $TiO_2$ and, optionally, $ZrO_2$ to thereafter be crystallized in situ to yield beta-spodumene solid solution as substantially the only crystal phase present, exhibited very low coefficients of thermal expansions and high viscosities at elevated temperatures. Nevertheless, such articles were extremely difficult to crystallize in situ without cracking occurring when the cross section of the articles was of any substantial thickness. This cracking was caused by sharp stress differentials being set up in the body as the initial crystal phase formed at lower temperatures, viz., beta-eucryptite solid solution, crystallized and was then transformed to beta-spodumene solid solution as the heat treating temperature was raised. The highly-siliceous, residual glassy phase was so viscous at the temperatures of crystallization that flow therein adequate to permit stress release was inhibited such that cracking could result.

Therefore, to provide means for decreasing the viscosity of the glassy phase during the initial crystallization step such as to reduce the hazard of cracking, a minor amount of at least one of the following metal oxides was included in the glass composition: $SrO$, $Y_2O_3$, $La_2O_3$, and $Ta_2O_5$. Furthermore, the inclusion of these metal oxides in the compositions led to the growth of very minor amounts of crystal phases wherein the metal oxides are also present. This latter factor acted to improve the dimensional stability and creep resistance of the resultant glass-ceramic articles at high temperatures. Thus, the glass-ceramic articles produced demonstrated excellent resistance to creep at temperatures up to 1,000°C.

Nevertheless, although those articles did, indeed, exhibit a markedly improved behavior with respect to cracking during the initial crystallization sequence, considerable care was still required to insure the complete absence of cracking. Furthermore, problems in forming the original glass bodies from the molten batches are encountered.

Furthermore, in general, the compositions disclosed in U.S. Pat. No. 3,582,385 and application Ser. No. 82,844, supra, are difficult to melt and form into intricate shapes and require long heat treating schedules to fully develop all the crystal phases and assure that the residual glassy matrix is at a minimum.

Therefore, the primary objectives of this invention are four:

1. to provide glass compositions which exhibit a desirable liquidus viscosity that will facilitate the forming of intricate shapes;

2. to provide glass compositions which display excellent resistance to cracking during the crystallization heat treatment;

3. to provide glass-ceramic bodies which demonstrate low coefficients of thermal expansion and good resistance to creep at temperatures up to 1,000°C.; and 4. to provide glass compositions capable of being crystallized to glass-ceramic bodies exhibiting those desired properties through relatively short heat treating schedules.

The inclusion of ZnO in $Li_2O$-$Al_2O_3$-$SiO_2$ glasses results in the lowering of the liquidus temperature of such compositions without introducing a substantial softening effect, i.e., a significant decrease in the viscosity of the melt at any given temperature. This, in essence, means that the viscosity of the melt at the liquidus has been effectively increased. This phenomenon enables intricate shapes, such as multi-bore tubing for regenerative heat exchanger units or emissions control substrate bodies, to be formed at a more favorable, lower temperature-higher viscosity environment without hazarding premature, uncontrolled devitrification.

The crux of the instant invention lies in the discovery that, within a narrow range of $Li_2O$-$Al_2O_3$-$SiO_2$ compositions containing $TiO_2$ as the nucleating agent, a strictly defined mole-for-mole substitution of ZnO for $Li_2O$ will lead to the development of a minor quantity of gahnite crystallization ($ZnO \cdot Al_2O_3$) in addition to the principal beta-spodumene solid solution. This gahnite phase exhibits excellent thermal stability, its presence being observed to persist without dissolution up to temperatures as high as 1,200°C. Furthermore, the inclusion of ZnO in the compositions also lowers the liquidus temperature of the melt without softening the glass to any substantial extent.

Also, the combination of ZnO with a second metal oxide ($R_mO_n$) selected from the group consisting of SrO, BaO, $Y_2O_3$, $La_2O_3$, and mixtures thereof, appears to impart to the glass body extraordinary resistance to cracking during the crystallization heat treatment. The ZnO and the secondary metal oxide seemingly act in concert to not only cause a fluxing action, such as was described in U.S. application Ser. No. 82,844, supra, but it appears that they can also retard the frequently excessively rapid crystallization of the initially-developed beta-quartz or beta-eucryptite solid solution phase, thereby promoting even more effective stress release.

The extent of the ZnO-for-$Li_2O$ molar substitution must be carefully controlled to insure that: (1) undesirable crystal phases such as cristobalite will not be developed; (2) any minor phases associated with the secondary metal oxides can crystallize without interference; and (3) gahnite will crystallize during the heat treatment. These requirements severely limit the extent of the ZnO-for-$Li_2O$ substitution. Hence, the molar ratio ZnO:$Li_2O$ must be held between about 1:4 – 1:9 with a ratio of 1:6.5 being greatly preferred. Furthermore, inasmuch as the secondary metal oxides tend to soften or flux the molten glass, their substitution for $Li_2O$ is to be avoided so as to permit the full utilization of the liquidus temperature reducing effect and gahnite development afforded by the ZnO-for-$Li_2O$ substitution.

To assure the greatest creep resistance and dimensional stability at high temperatures, the $Al_2O_3$ content is compelled to be adjusted to compensate for the addition of the secondary metal oxides. Hence, the $Al_2O_3$ content must be such that the molar ratio $Al_2O_3$:($Li_2O$ + ZnO + $nR_mO_n$) must be maintained above 0.95 and, preferably, higher than unity. Where that ratio assumes a value less than 0.95, the resultant glass-ceramic bodies frequently exhibit inferior microstructure, phase development, and/or physical properties.

Therefore, glass-ceramic articles illustrating coefficients of thermal expansion (25°–900°C.) of less than about $10 \times 10^{-7}$/°C. and excellent resistance to creep at temperatures up to 1,000°C. can be produced through the heat treatment of glass bodies consisting essentially, by weight on the oxide basis, of about 62–73% $SiO_2$, 15–23% $Al_2O_3$, 3–5% $Li_2O$, 1–3% ZnO, 3–6% $TiO_2$, and 1–5% $R_mO_n$, wherein $R_mO_n$ consists of SrO, BaO, $Y_2O_3$, $La_2O_3$, and mixtures thereof, and wherein the molar ratio ZnO:$Li_2O$ varies between about 1:4 – 1:9 and the molar ratio $Al_2O_3$:($Li_2O$ + ZnO + $nR_mO_n$) is greater than 0.95. The heat treatment schedule contemplates nucleation in the 750°–900°C. range and crystallization in the 900°–1250°C. range. Specific time-temperature schedules for nucleation and crystallization are essentially limitless in number. In general, however, periods for nucleation will range between about 1/4–6 hours and for crystallization will range between about 1–12 hours. Longer nucleation and crystallization times, of course, can be employed with no deleterious effect on the final product and can, in some instances, actually improve the high temperature stability thereof. However, commercial practice normally desires the use of the shortest nucleation and crystallization schedules which will yield products having the required internal microstructure and physical properties consistent with the intended application.

The above-delineated amounts of $Li_2O$, ZnO, $Al_2O_3$, $SiO_2$, $R_mO_n$, and nucleating agent are demanded to secure glasses having the desired forming properties and which will resist cracking during crystallization in situ as well as to obtain glass-ceramic articles exhibiting coefficients of thermal expansion below about $10 \times 10^{-7}$/°C. (25°–900°C.) and excellent creep resistance to temperatures up to about 1,000°C. In addition, the molar ratio $ZnO:Li_2O$ of 1:4 – 1:9 and the molar ratio $Al_2O_3:(Li_2O + ZnO + nR_mO_n)$ above 0.95 must also be maintained. $ZrO_2$ may be included as a secondary nucleant in amounts up to about 2% by weight but its presence can lead to premature phase separation and imperfect growth of gahnite and/or the $R_mO_n$-related crystal phase. Therefore, in general, $TiO_2$ is employed as the sole nucleating agent where the higher creep resistance and dimensional stability are desired.

Table I records the compositions of several thermally crystallizable glasses, expressed on the oxide basis both in terms of weight percent and in molar ratios, which are illustrative of examples operable in the present invention. The actual batch ingredients therefor may be any materials, either oxides or other compounds, which, on being melted together, will be converted to the desired oxide composition in the desired proportions. The batch ingredients were dry ballmilled together to aid in obtaining a homogeneous melt and then placed into platinum crucibles. The crucibles, equipped with a platinum stirring device, were placed in a gas-fired furnace and the batches melted at 1,500°–1,650°C. for about 16 hours. Glass cane about one-fourth inch in diameter were hand drawn from each melt and the remainder of the melt rolled between steel rollers into plates about 4 inches ×½ inch × 6–8 inches in length. The glass was immediately transferred to an annealer operating at about 650°–700°C. $As_2O_3$ was included in each of the batches to serve as a fining agent although it will be recognized that other conventional fining agents could be substituted therefor.

TABLE I

| (Weight Percent) | 1 | 2 | 3 | 4 | 5 | 6 | 7 | 8 |
|---|---|---|---|---|---|---|---|---|
| $SiO_2$ | 63.5% | 64.3% | 70.2% | 70.2% | 70.8% | 70.6% | 71.2% | 71.4% |
| $Al_2O_3$ | 22.1 | 21.2 | 17.3 | 17.4 | 17.5 | 16.9 | 17.0 | 16.3 |
| $Li_2O$ | 4.6 | 4.6 | 3.7 | 3.8 | 3.8 | 3.5 | 3.7 | 3.6 |
| ZnO | 1.9 | 1.9 | 1.5 | 1.6 | 1.6 | 2.1 | 1.6 | 1.5 |
| $TiO_2$ | 4.2 | 4.8 | 4.1 | 4.3 | 3.5 | 4.2 | 3.8 | 4.4 |
| $As_2O_3$ | 0.7 | 0.7 | 0.7 | 0.8 | 0.8 | 0.8 | 0.8 | 0.9 |
| SrO | 3.0 | 2.5 | 2.4 | 2.0 | 2.0 | 2.0 | 2.0 | 1.9 |
|  | 9 | 10 | 11 | 12 | 13 | 14 | 15 | 16 |
| $SiO_2$ | 63.6% | 69.5% | 70.1% | 70.5% | 64.2% | 69.7% | 71.1% | 71.3% |
| $Al_2O_3$ | 21.0 | 17.2 | 17.3 | 16.9 | 21.2 | 17.6 | 17.6 | 16.3 |
| $Li_2O$ | 4.6 | 3.8 | 3.8 | 3.7 | 4.6 | 3.6 | 3.8 | 3.6 |
| ZnO | 1.9 | 1.6 | 1.6 | 1.5 | 1.9 | 1.5 | 1.6 | 1.5 |
| $TiO_2$ | 4.7 | 4.2 | 3.5 | 3.8 | 4.7 | 4.1 | 3.6 | 4.4 |
| $As_2O_3$ | 0.7 | 0.8 | 0.8 | 0.8 | 0.7 | 0.7 | 0.8 | 0.9 |
| BaO | 3.6 | 3.0 | 3.0 | 2.9 | — | — | — | — |
| $Y_2O_3$ | — | — | — | — | 2.7 | 2.6 | 1.5 | 2.0 |
|  | 17 | 18 | 19 | 20 | 21 | 22 |  |  |
| $SiO_2$ | 71.5% | 63.4% | 68.9% | 70.7% | 70.7% | 71.1% |  |  |
| $Al_2O_3$ | 17.1 | 20.9 | 17.4 | 16.2 | 17.5 | 17.0 |  |  |
| $Li_2O$ | 3.7 | 4.6 | 3.6 | 3.5 | 3.8 | 3.7 |  |  |
| ZnO | 1.6 | 1.9 | 1.5 | 1.5 | 1.6 | 1.6 |  |  |
| $TiO_2$ | 3.8 | 4.7 | 4.1 | 4.3 | 3.5 | 3.8 |  |  |
| $As_2O_3$ | 0.8 | 0.7 | 0.7 | 0.9 | 0.8 | 0.8 |  |  |
| $Y_2O_3$ | 1.4 | — | — | — | — | — |  |  |
| $La_2O_3$ | — | 3.8 | 3.8 | 3.0 | 2.1 | 2.1 |  |  |

| (Mole Ratio) | 1 | 2 | 3 | 4 | 5 | 6 | 7 | 8 |
|---|---|---|---|---|---|---|---|---|
| $SiO_2$ | 45.00 | 45.00 | 62.00 | 60.00 | 60.00 | 62.00 | 62.00 | 65.00 |
| $Al_2O_3$ | 9.25 | 8.75 | 9.00 | 8.75 | 8.75 | 8.75 | 8.75 | 8.75 |
| $Li_2O$ | 6.50 | 6.50 | 6.50 | 6.50 | 6.50 | 6.10 | 6.50 | 6.50 |
| ZnO | 1.00 | 1.00 | 1.00 | 1.00 | 1.00 | 1.40 | 1.00 | 1.00 |
| $TiO_2$ | 2.25 | 2.50 | 2.75 | 2.75 | 2.25 | 2.75 | 2.50 | 3.00 |
| $As_2O_3$ | 0.15 | 0.15 | 0.20 | 0.20 | 0.20 | 0.20 | 0.20 | 0.25 |
| SrO | 1.25 | 1.00 | 1.25 | 1.00 | 1.00 | 1.00 | 1.00 | 1.00 |
|  | 9 | 10 | 11 | 12 | 13 | 14 | 15 | 16 |
| $SiO_2$ | 45.00 | 60.00 | 60.00 | 62.00 | 45.00 | 62.00 | 60.00 | 65.00 |
| $Al_2O_3$ | 8.75 | 8.75 | 8.75 | 8.75 | 8.75 | 9.25 | 8.75 | 8.75 |
| $Li_2O$ | 6.50 | 6.50 | 6.50 | 6.50 | 6.50 | 6.50 | 6.50 | 6.50 |
| ZnO | 1.00 | 1.00 | 1.00 | 1.00 | 1.00 | 1.00 | 1.00 | 1.00 |
| $TiO_2$ | 2.50 | 2.75 | 2.25 | 2.50 | 2.50 | 2.75 | 2.25 | 3.00 |
| $As_2O_3$ | 0.15 | 0.20 | 0.20 | 0.20 | 0.15 | 0.20 | 0.20 | 0.25 |
| BaO | 1.00 | 1.00 | 1.00 | 1.00 | — | — | — | — |
| $Y_2O_3$ | — | — | — | — | 0.50 | 0.625 | 0.333 | 0.50 |
|  | 17 | 18 | 19 | 20 | 21 | 22 |  |  |
| $SiO_2$ | 62.00 | 45.00 | 62.00 | 65.00 | 60.00 | 62.00 |  |  |
| $Al_2O_3$ | 8.75 | 8.75 | 9.25 | 8.75 | 8.75 | 8.75 |  |  |
| $Li_2O$ | 6.50 | 6.50 | 6.50 | 6.50 | 6.50 | 6.50 |  |  |
| ZnO | 1.00 | 1.00 | 1.00 | 1.00 | 1.00 | 1.00 |  |  |
| $TiO_2$ | 2.50 | 2.50 | 2.75 | 3.00 | 2.25 | 2.50 |  |  |
| $As_2O_3$ | 0.20 | 0.15 | 0.20 | 0.25 | 0.20 | 0.20 |  |  |
| $Y_2O_3$ | 0.333 | — | — | — | — | — |  |  |
| $La_2O_3$ | — | 0.50 | 0.625 | 0.50 | 0.333 | 0.333 |  |  |

Crystallization of the glass body takes place more rapidly at higher temperatures within the crystallization range than in the cooler extreme thereof. However, it is readily appreciated that as the crystallization phenomenon begins, the proportion of glassy matrix to crystals is very large such that the glass body will deform if the temperature is raised too rapidly approaching and exceeding the softening point of the glass. Hence, the rate at which the temperature is increased into the crystallization range must not be so rapid that the growth of crystals is insufficient to support the body against deformation. Where the glass body is of a geometry such as to permit some means of physical support, very rapid rates of heat treatment can be employed. In general, however, temperature increases not exceeding about 300°C./hour have been found suitable for most applications.

Although normal practice contemplates cooling the parent glass body to about room temperature for visual examination of glass quality before crystallizing in situ, such as not necessary. Where desired, the parent glass article need only be cooled below the transformation range of the glass and the crystallization heat treatment begun immediately thereafter. The transformation range is that temperature at which a liquid have been deemed to have been transformed into an amorphous solid, this temperature usually being considered as lying between the strain and annealing points of a glass.

Commonly, the crystallization procedure followed is similar to the schedules set out in Table II below. That is, specific dwell periods are employed at temperatures within the nucleating and crystallization ranges. Nevertheless, such specificity is frequently merely a matter of convenience since the glass can be very satisfactorily crystallized by simply moving it within those two ranges with no finite dwell period of any duration. In sum, the heat treatment schedule only demands: (1) that the glass remain within the nucleation range for a sufficient length of time to insure a substantial development of nuclei such that the crystals grown thereon will be fine-grained; and (2) that the nucleated glass remain within the crystallization range for a sufficient length of time to achieve the desired highly crystalline product.

Inasmuch as the coefficient of thermal expansion of the crystallized body is so low as to approach zero, little care need be exercised in cooling the article from the crystallization range. Hence, the crystallized articles normally can be removed directly from the heat treating chamber and permitted to cool in the ambient atmosphere. However, in the examples recorded in Table II, it was convenient to simply cut off the current to the electrically-heated furnace and allow the furnace to cool to room temperature with the crystallized articles inside. That practice, termed cooling at furnace rate, has been estimated at about 3°-5°C./minute.

Table II reports the heat treatment schedules to which the examples were subjected, each schedule being given a letter designation. Table III records the heat treatment schedule, in terms of letter designation, to which each example was subjected along with the crystal phases contained therein as identified through X-ray diffraction analysis and the coefficient of thermal expansion (25°-900°C.) as measured in the conventional manner utilizing a differential dilatometer. Also, a measure of the creep resistance of the crystallized bodies at 1,000°C. was determined in terms of "apparent viscosity" utilizing the beam bending method described by H. E. Hagy in "Experimental Evaluation of Beam-Bending Method of Determining Glass Viscosities in the Range $10^8$ to $10^{15}$ Poises", *Journal of the American Ceramic Society*, 46, No. 2, pp. 93–97, February, 1963.

A determination of the apparent viscosity demonstrated by the crystallized body after being held for 1 hour at 1,000°C. provides a comparatively simple and rapid means for estimating the relative high temperature stability to be expected from a material after extended periods of operation. Inasmuch as the beam bending procedure contemplates a measurement of sample deformation under an applied load, commonly 1,500–2,000 psi, it cannot provide a direct reading as to dimensional changes which an article will undergo at elevated temperatures with no load applied thereto. That type of measurement is secured through the length comparator test described by Wilmer Souder and Peter Hidnet, "Measurement of the Thermal Expansion of Fused Silica", *Scientific Papers of the Bureau of Standards*, 21, pp. 1–23, Sept. 21, 1965. Nevertheless, experience with the two methods has demonstrated that materials exhibiting high apparent viscosity values, as determined by the beam bending technique, will also normally manifest superior creep resistance and long-term dimensional stability at high temperatures when measured according to the length comparator test.

The "Y Phase" reported in Examples 13–17 is characterized by strong X-ray diffraction lines at d-spacings of about 2.93A, 2.77A, and 1.74A. The $Y_2Ti_2O_7$ phase, which commonly appears in similar compositions nucleated with $TiO_2$ but which do not contain ZnO (Ser. No. 82,844, supra), is present in very minor amounts, if at all, after the crystallization heat treatment. It has been discovered that subjecting the crystallized bodies of the instant invention to temperatures within the 1,000°–1,100°C. range for very extended periods of time, e.g. greater than about 24 hours, causes the Y Phase to slowly revert to $Y_2Ti_2O_7$. A second feature of such prolonged heat treatments is the frequent increase in the amount of rutile observed. These observations have suggested that the Y Phase may be a metastable form of $Y_2Ti_2O_7$ ($Y_2O_3 \cdot 2TiO_2$) or a compound of the form $Y_2O_3 \cdot nTiO_2$ wherein $N>2$.

The structures of the lanthanum-containing phases are difficult to assign with complete certainty in Examples 18–22. X-ray diffraction lines at d-spacings most characteristic of $La_2Ti_2O_7$ occur in each composition with several also showing lines which could be the result of the presence of $La_2O_3$.

TABLE II

| Letter Designation | Heat Treatment Schedule |
|---|---|
| A | Room temperature to 800°C. at 200°C./hour<br>Hold at 800°C. for 2 hours<br>Raise temperature to 1150°C. at 200°C./hour<br>Hold at 1150°C. for 4 hours<br>Cool to room temperature at furnace rate. |
| B | Room temperature to 800°C. at 200°C./hour<br>Hold at 800°C. for 4 hours<br>Raise temperature to 1150°C. at 200°C./hour<br>Hold at 1150°C. for 4 hours<br>Cool to room temperature at furnace rate. |
| C | Room temperature to 850°C. at 300°C./hour<br>Hold at 850°C. for 2 hours |

TABLE II-Continued

| Letter Designation | Heat Treatment Schedule |
|---|---|
|  | Raise temperature to 1150°C. at 300°C./hour<br>Hold at 1150°C. for 4 hours<br>Cool to room temperature at furnace rate. |
| D | Room temperature to 800°C. at 200°C./hour<br>Hold at 800°C. for 4 hours<br>Raise temperature to 1150°C. at 200°C./hour<br>Hold at 1150°C. for 4 hours<br>Cool to 850°C. at 200°C./hour<br>Hold at 850°C. for 2 hours<br>Raise temperature to 1050°C. at 200°C./hour<br>Hold at 1050°C. for 10 hours<br>Cool to room temperature at furnace rate. |
| E | Room temperature to 825°C. at 300°C./hour<br>Hold at 825°C. for 1 hour<br>Raise temperature to 1200°C. at 200°C./hour<br>Hold at 1200°C. for 2 hours<br>Cool to 1050°C. at 200°C./hour<br>Hold at 1050°C. for 2 hours<br>Cool to room temperature at furnace rate. |
| F | Room temperature to 825°C. at 300°C./hour<br>Hold at 825°C. for 1 hour<br>Raise temperature to 1120°C. at 200°C./hour<br>Hold at 1120°C. for 2 hours<br>Cool to 1050°C. at 200°C./hour<br>Cool to room temperature at furnace rate. |

Table IV records the composition of several thermally crystallizable glasses, expressed on the oxide basis both in terms of weight percent and in molar ratios, which are close to but outside the scope of the present invention, primarily because the $ZnO:Li_2O$ ratios are not within the ranges spelled out therefor. The glass articles were fabricated in like manner to those reported in Table I. Table IV also recites the crystallization heat treatment applied to each and the crystal phases present in each as identified through X-ray diffraction analyses.

TABLE IV

| | 23 | 24 | 25 | 26 | 27 |
|---|---|---|---|---|---|
| | (Weight Percent) | | | | |
| $SiO_2$ | 72.7% | 71.2% | 70.4% | 70.8% | 70.4% |
| $Al_2O_3$ | 15.6 | 17.0 | 16.9 | 17.0 | 16.9 |
| $Li_2O$ | 3.6 | 3.9 | 3.1 | 3.1 | 3.1 |
| ZnO | 0.8 | 0.9 | 3.1 | 3.1 | 3.1 |
| SrO | 1.9 | 2.0 | 2.0 | — | — |
| $Y_2O_3$ | — | — | — | 1.4 | — |
| $La_2O_3$ | — | — | — | — | 2.1 |
| $TiO_2$ | 4.5 | 4.2 | 3.8 | 3.8 | 3.8 |
| $As_2O_3$ | 0.9 | 0.8 | 0.8 | 0.8 | 0.8 |
| | (Mole Ratio) | | | | |
| | 23 | 24 | 25 | 26 | 27 |
| $SiO_2$ | 65.0 | 62.0 | 62.0 | 62.0 | 62.0 |
| $Al_2O_3$ | 8.25 | 8.75 | 8.75 | 8.75 | 8.75 |
| $Li_2O$ | 6.50 | 6.90 | 5.50 | 5.50 | 5.50 |
| ZnO | 0.50 | 0.60 | 2.00 | 2.00 | 2.00 |
| SrO | 1.00 | 1.00 | 1.00 | — | — |
| $Y_2O_3$ | — | — | — | 0.33 | — |

TABLE III

| Example No. | Heat Treatment | Crystal Phases | Expansion Coefficient $(\times 10^{-7}/°C.)$ | Apparent Viscosity (Poises) |
|---|---|---|---|---|
| 1 | A | Beta-spodumene s.s., Gahnite, Rutile, $SrO \cdot Al_2O_3 \cdot 2SiO_2$ | | |
| 2 | A | do. | | |
| 3 | A | do. | 9.5 | $3.6 \times 10^{13}$ |
| 4 | A | Beta-spodumene s.s., Gahnite, Anatase, $SrO \cdot Al_2O_3 \cdot 2SiO_2$ | 3.7 | $2.0 \times 10^{13}$ |
| 4 | E | do. | 3.7 | $8.6 \times 10^{13}$ |
| 5 | C | Beta-spodumene s.s., Gahnite, Rutile, $SrO \cdot Al_2O_3 \cdot 2SiO_2$ | | |
| 5 | D | do. | 3.8 | |
| 6 | A | do. | | |
| 7 | C | do. | | |
| 8 | A | do. | | |
| 8 | C | do. | | |
| 9 | A | Beta-spodumene s.s., Gahnite, Anatase, $BaO \cdot Al_2O_3 \cdot 2SiO_2$ | 8.4 | $4.7 \times 10^{13}$ |
| 9 | C | do. | | |
| 10 | B | do. | 7.4 | $8.0 \times 10^{13}$ |
| 10 | F | do. | 5.0 | $8.6 \times 10^{13}$ |
| 11 | C | Beta-spodumene s.s., Gahnite, Rutile, $BaO \cdot Al_2O_3 \cdot 2SiO_2$ | | |
| 11 | D | do. | 4.2 | $2.6 \times 10^{13}$ |
| 12 | C | do. | | |
| 13 | A | Beta-spodumene s.s., Gahnite, Rutile, "Y Phase" | 8.3 | $2.8 \times 10^{13}$ |
| 13 | C | do. | | |
| 14 | A | Beta-spodumene s.s., Gahnite, Rutile, "Y Phase", $Y_2Ti_2O_7$ | | |
| 15 | D | Beta-spodumene s.s., Gahnite, Rutile, "Y Phase" | 4.0 | $3.5 \times 10^{13}$ |
| 16 | A | do. | | |
| 17 | E | do. | 3.4 | $9.5 \times 10^{13}$ |
| 18 | A | Beta-spodumene s.s., Gahnite, Rutile, $La_2Ti_2O_7$ | 10.1 | $4.4 \times 10^{14}$ |
| 18 | C | Beta-spodumene s.s., Gahnite, Rutile, $La_2Ti_2O_7$, $La_2O_3$ | | |
| 19 | A | Beta-spodumene s.s., Gahnite, Rutile, $La_2Ti_2O_7$ | | |
| 20 | A | do. | | |
| 20 | C | Beta-spodumene s.s., Gahnite, Rutile, $La_2Ti_2O_7$, $La_2O_3$ | | |
| 21 | D | do. | 5.5 | $4.6 \times 10^{13}$ |
| 22 | E | do. | 5.4 | $1.3 \times 10^{14}$ |

TABLE IV-Continued

| | (Weight Percent) | | | | |
|---|---|---|---|---|---|
| | 23 | 24 | 25 | 26 | 27 |
| $La_2O_3$ | — | — | — | — | 0.33 |
| $TiO_2$ | 3.00 | 2.75 | 2.50 | 2.50 | 2.50 |
| $As_2O_3$ | 0.25 | 0.20 | 0.20 | 0.20 | 0.20 |

(Heat Treatment and Crystal Phases)

| Example No. | Heat Treatment | Crystal Phases |
|---|---|---|
| 23 | A | Beta-spodumene s.s., Anatase, $SrO \cdot Al_2O_3 \cdot 2SiO_2$ |
| 24 | A | Beta-spodumene s.s., Anatase, $SrO \cdot Al_2O_3 \cdot 2SiO_2$ |
| 25 | C | Beta-spodumene s.s., Gahnite, Rutile, $SrO \cdot Al_2O_3 \cdot 2SiO_2$, Cristobalite |
| 26 | C | Beta-spodumene s.s., Gahnite, Rutile, "Y" Phase, Cristobalite |
| 27 | C | Beta-spodumene s.s., Gahnite, Rutile, $La_2Ti_2O_7$, Cristobalite |

Examples 23 and 24 are representative of compositions wherein the ZnO content is too low to develop the required gahnite phase. In contrast, Examples 25-27 are illustrative of compositions wherein the ZnO:Li$_2$O ratio is greater than 1:4, viz., 2:5.5. The silica polymorph cristobalite is formed which exhibits a high coefficient of thermal expansion that can lead to cracking of the body due to unequal stresses developing therein and may also contribute to dimensional instability.

Table V provides a comparison of the melting and forming behavior of Examples 6 and 10 with glass compositions similar to those of the instant invention but free from zinc oxide. Thus, the liquidus temperature is recorded for each along with the viscosity, in poises, of the melt at that temperature. Also, a reading is given of the temperature at which the melt exhibits a viscosity of $10^3$, $10^4$, and $10^5$ poises. As can be clearly seen, the addition of ZnO lowers the liquidus temperature very markedly but without softening the glass to any substantial extent.

TABLE V

| | (Weight Percent) | | | |
|---|---|---|---|---|
| | 28 | 4 | 29 | 10 |
| $SiO_2$ | 71.6% | 70.2% | 70.9% | 69.5% |
| $Al_2O_3$ | 17.1 | 17.4 | 17.0 | 17.2 |
| $Li_2O$ | 4.3 | 3.8 | 4.3 | 3.8 |
| ZnO | — | 1.6 | — | 1.6 |
| SrO | 2.0 | 2.0 | — | — |
| BaO | — | — | 2.9 | 3.0 |
| $TiO_2$ | 4.2 | 4.2 | 4.2 | 4.2 |
| $As_2O_3$ | 0.8 | 0.8 | 0.8 | 0.8 |
| | (Mole Ratio) | | | |
| | 28 | 4 | 29 | 10 |
| $SiO_2$ | 62.00 | 60.00 | 62.00 | 60.00 |
| $Al_2O_3$ | 8.75 | 8.75 | 8.75 | 8.75 |
| $Li_2O$ | 7.50 | 6.50 | 7.50 | 6.50 |
| ZnO | — | 1.00 | — | 1.00 |
| SrO | 1.00 | 1.00 | — | — |
| BaO | — | — | 1.00 | 1.00 |
| $TiO_2$ | 2.75 | 2.75 | 2.75 | 2.75 |
| $As_2O_3$ | 0.20 | 0.20 | 0.20 | 0.20 |
| Liquidus °C. | 1313 | 1285 | 1307 | 1265 |
| Liquidus Viscosity | 23,000 | 33,000 | 34,000 | 47,000 |
| $10^3$ | 1557 | 1560 | 1575 | 1550 |
| $10^4$ | 1373 | 1365 | 1393 | 1368 |
| $10^5$ | 1222 | 1215 | 1237 | 1217 |

Tables I-V amply illustrate the composition and process parameters which must be observed to yield glasses having improved forming characteristics and final glass-ceramic bodies exhibiting the desired low coefficients of thermal expansion coupled with excellent creep resistance at temperatures up to 1,000°C. and higher. Hence, as is clearly pointed out in Table V, the substitution of ZnO for Li$_2$O to the base Li$_2$O-Al$_2$O$_3$-SiO$_2$ glasses causes the lowering of the liquidus temperature of the glass without concurrently causing a substantial decrease in the viscosity of the melt at any specific temperature. Such a phenomenon greatly improves the forming behavior of the glass. The crystal content of the glass-ceramic body is in excess of 75% by volume and, frequently, exceeds 90% by volume, being a function of the heat treatment schedule employed and teh extent to which the components of the batch are adaptable to the formation of crystal phases. The individual crystals are relatively uniformly fine-grained, essentially all being smaller than five microns in diameter and the majority being less than about two microns.

Heat treatment schedules E and F offer a very desirable combination of low coefficient of thermal expansion with good creep resistance after relatively short periods of crystallization. These schedules appear to permit the very adequate development of both the primary and secondary crystal phases with a consequent minimum of residual glass in the crystallized body. The judicious selection of heat treating schedule will allow the tailoring of a final product to exhibit outstanding creep resistance. Thus, heat treatment schedule A, when applied to Example 18, imparted an apparent viscosity thereto of up to an order of magnitude greater than normally measured on the La$_2$O$_3$-containing glass-ceramic articles.

Based upon the forming character of the parent glass and the physical properties of the final glass-ceramic article, Examples 4, 17, and 22, when crystallized in situ employing the heat treatment schedules recorded therefor in Table III, are the preferred compositions.

1. A method for producing a fine-grained glass-ceramic article exhibiting a coefficient of thermal expansion (25°–900°C.) below about $10 \times 10^{-7}$/°C. and excellent creep resistance and dimensional stability up to about 1,000°C. wherein beta-spodumene solid solution constitutes the principal crystal phase and gahnite constitutes a secondary crystal phase which comprises:

a. melting a batch for a glass composition consisting essentially, by weight on the oxide basis, of about 62–73% SiO$_2$, 15–23% Al$_2$O$_3$, 3–5% Li$_2$O, 1–3% ZnO, 3–6% TiO$_2$, and 1–5% R$_m$O$_n$, wherein R$_m$O$_n$ consists of SrO, BaO, Y$_2$O$_3$, La$_2$O$_3$, and mixtures thereof, and wherein the molar ratio ZnO:Li$_2$O varies between about 1:4 – 1:9 and the molar ratio Al$_2$O$_3$:(Li$_2$O + ZnO + nR$_m$O$_n$) is greater than 0.95;

b. simultaneously cooling the melt at least below the transformation range thereof and shaping a glass article of a desired configuration therefrom;

c. heating said glass article to a temperature between about 750°–900°C. for a period of time sufficient to cause substantial nucleation of said article;

d. heating said article to a temperature between about 900°–1,250°C. for a period of time sufficient to cause the article to crystallize in situ; and then e. cooling said crystallized article to room temperature.

2. A method according to claim 1 wherein said period of time sufficient to cause substantial nucleation ranges between about 1/4–6 hours.

3. A method according to claim 1 wherein said period of time sufficient to cause the article to crystallize in situ ranges between about 1–12 hours.

* * * * *